H. H. MAY.
Plow.
No. 3,069.
Patented May 2, 1843.
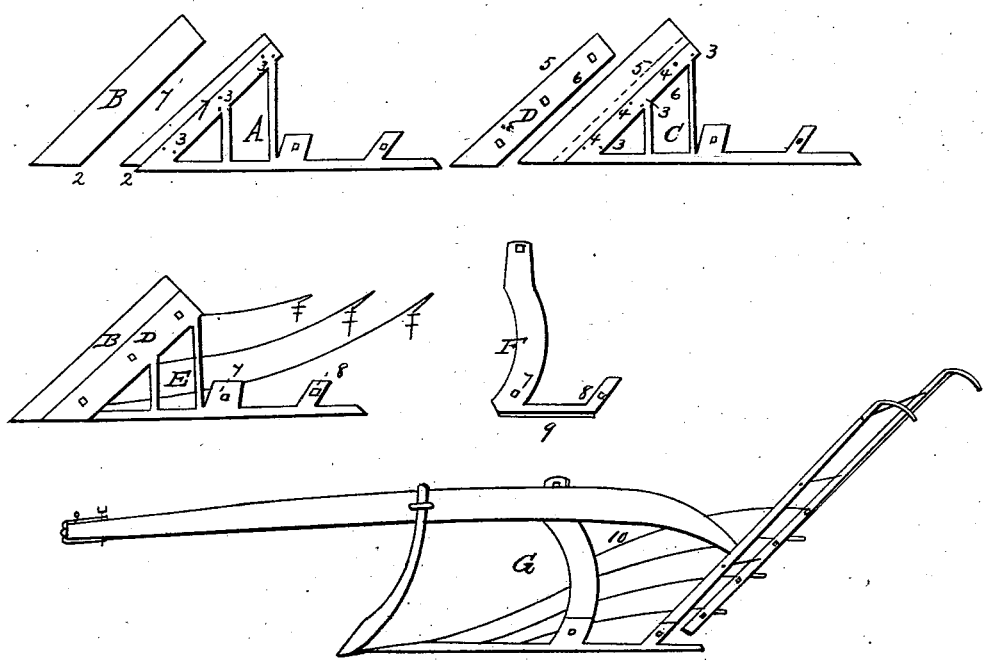

UNITED STATES PATENT OFFICE.

HARVEY H. MAY, OF GALESBURG, ILLINOIS.

IMPROVEMENT IN PLOWS.

Specification forming part of Letters Patent No. 3,069, dated May 2, 1843.

*To all whom it may concern:*

Be it known that I, HARVEY H. MAY, of Galesburg, in the county of Knox and State of Illinois, have invented a new and Improved Mode of Constructing Plows; and I do hereby declare that the following is a full and exact description.

The nature of my invention consists—

First, in the mode of constructing and fastening shares to sod-plows so as to take the shares out and sharpen them without inconvenience or damage. I fasten them between jaws acting like a vise. When the shares are bolted to the plows in the common way the often sharpening which is necessary in this country draws the shares continually from the bolt-holes. My shares are a thin plate of iron or steel about two feet long for a two-horse plow. These thin shares always fit between the jaws. When the shares are riveted and welded to the plows the often sharpening gets the plows out of shape. My plows are always in shape and ready for a sharp share. I take two or three shares to the prairie, so that if one share needs to go to the smith I can put a sharp share to the plow in five minutes and continue my plowing.

Second, in using rods in lieu of mold-boards, so that the fine dirt may fall into the furrow again. The fine dirt in this country adheres so tenaciously to mold-boards that the plowmen are compelled to carry a paddle to cleave the dirt from the mold-boards.

To enable others skilled in the art to make and use my invention, I will proceed to describe its construction and operation, reference being had to the annexed drawings, making a part of this specification.

Drawing A represents the bottom of the plow, which I make of cast-iron.

Drawing B represents the share or edge. It is to lie on the front of the bottom, so that the edge, Fig. 1, is placed against a ridge at 1 A. This ridge prevents the share from being pressed any farther back. A lip is turned down at 2 B, which fits a corresponding notch at 2 A. This prevents the share from working to the right on the bottom. A and B thus put together is represented at C. Three rods serve in lieu of a mold-board. The fore end of each is inserted through the holes 3 3 3 C, and bent back while hot, making a short turn at the holes.

D represents the overlay, the front edge of which is sharp, and is placed at 5 C. The other edge, 6 D, is placed over the forward ends of the rods, so that holes 4 4 4 D come directly over holes 4 4 4 C. At these holes C and D are bolted together, as at E, with nuts on the lower side. Thus, C D form a vise to hold the share B completely, as at E, and at the same time the overlay D conveys the sod by a smooth easy ascent to the rods.

F represents the post, the lower part of which is placed on the inside of the landside, (of the bottom,) and is there bolted to the landside at 7 8. The bolt at 8 holds also the lower end of the plow-handle. At 9, F is a lip which fits a groove on the inside of the bottom of the landside, which lip, together with the bolts 7 and 8, prevent the post from moving.

G represents all the above-named parts put together so as to form a plow. The back end of the rods I let run beyond the handle, and then back to the handle, and in such a form as to go through the handle. Upon these rods, and on each side of the handle, I put nuts, which enable me to set the rods out at will, and thus throw the furrow as hard as I wish. At 10, G is a rod running from the post (above the three rods last described) to the handle. This I call the "diving-rod," because it prevents the sod from diving over the other rods into the plow when the plow first enters the ground or when the sod breaks. At other times it seldom touches this rod.

What I claim as my invention, and desire to secure by Letters Patent, is—

The fastening of the shares or edges between jaws, so that a dull share can be quickly taken out to sharpen or to exchange without inconvenience; so that the shares can be made to fit in the field as well as in the shop; so that the often sharpening of the shares which is so necessary on these prairies does not spoil the shares by drawing them from the holes and out of shape, as is the case when bolts go through them; so as to avoid spoiling the running of the plow by sharpening, as is the case when the shares are riveted and welded; and so that the shares can be made with much less cost and risk than in either the common way of riveting and welding or of punching holes and fitting for bolts.

H. H. MAY.

Witnesses:
CARLOS J. CONE,
ROBERT BUSH.